United States Patent [19]

Leppanen

[11] Patent Number: 5,533,013

[45] Date of Patent: Jul. 2, 1996

[54] COMMUNICATION METHOD AND SYSTEM

[75] Inventor: Pentti Leppanen, Oulu, Finland

[73] Assignee: Nokia Mobile Phones Limited, Salo, Finland

[21] Appl. No.: 420,327

[22] Filed: Apr. 11, 1995

Related U.S. Application Data

[63] Continuation of Ser. No. 158,707, Nov. 29, 1993, abandoned.

[30] Foreign Application Priority Data

Dec. 1, 1992 [FI] Finland ................... 925472

[51] Int. Cl.$^6$ ................... H04B 7/204
[52] U.S. Cl. ................... 370/18; 370/20; 370/95.3; 455/38.1
[58] Field of Search ................... 370/18, 20, 69.1, 370/95.3, 19, 78; 455/33.1, 38.1; 379/58, 59, 60; 359/136; 375/205

[56] References Cited

U.S. PATENT DOCUMENTS

| | | | |
|---|---|---|---|
| 4,301,530 | 11/1981 | Gutleber ................... | 370/18 |
| 4,754,453 | 6/1988 | Eizenhöfer ................... | 370/95.1 |
| 4,799,252 | 1/1989 | Eizenhoffer et al. ................... | 379/59 |
| 5,056,109 | 10/1991 | Gilhousen et al. | |
| 5,103,459 | 4/1992 | Gilhousen et al. ................... | 375/1 |
| 5,170,412 | 12/1992 | Massey ................... | 375/1 |

FOREIGN PATENT DOCUMENTS

| | | | |
|---|---|---|---|
| 76523/87 | 8/1987 | Australia ................... | H04J 3/06 |
| 0211460 | 7/1986 | European Pat. Off. ................... | H04Q 7/04 |
| 0257110 | 8/1986 | European Pat. Off. ................... | H04J 13/00 |
| 82339 | 10/1990 | Finland ................... | H04B 7/26 |
| WO92/00639 | 1/1992 | WIPO ................... | H04L 27/30 |
| WO93/07693 | 4/1993 | WIPO ................... | H04J 13/00 |
| WO93/15573 | 8/1993 | WIPO ................... | H04J 13/00 |

OTHER PUBLICATIONS

University of California, Los Angeles, PH.D. Thesis, *GENERALIZED COMPLEMENTARY Code Sets*, B. Schweitzer, 72–13, 647, 1972.

Finnish Office Action dated 10 Aug. 1993 on Finnish Patent Application No. 925472 and English Translation thereof.

Sklar, B.; "*Digital Communications: Fundamentals and Applications*", Prentice Hall, Englewood Cliffs New Jersey, Chapters 9–10, 1988.

*Primary Examiner*—Douglas W. Olms
*Assistant Examiner*—Russell W. Blum
*Attorney, Agent, or Firm*—Perman & Green

[57] ABSTRACT

The invention is a communication method with the equipment belonging to it and its aim is to increase the number of users in a network or cell. Data is transmitted by the method by using a combined CDMA/TDMA or TDMA/CDMA multiple use whereby complementary code sets (complete orthogonal codes or non-interacting codes) are used as spreading codes. In the applications of the method to existing or planned TDMA systems, a CDMA part is added to them, by which a spreading coded CDMA multiple access is used in every time slot of the TDMA frame, in said way, to increase the number of users. The described method does not require any power control methods, nor any multiple access interference cancelling methods to increase network or cell capacity.

10 Claims, 6 Drawing Sheets

COMMUNICATION METHOD AND SYSTEM

This is a continuation of application(s) Ser. No. 08/158,707 filed on Nov. 29, 1993 abandoned.

FIELD OF THE INVENTION

The invention relates to a method for radio telephone communication. The invention also relates to corresponding communication equipment or system for implementing the method.

BACKGROUND TO THE INVENTION

In principle, for a multiple access communication in a radio channel there are three kinds of methods: the FDMA, the TDMA and the CDMA multiple access. The CDMA method has been made possible by the development of the spread spectrum technique. The spread spectrum technique has many known advantages as compared with the traditional communication methods. One of the fundamental reasons for using CDMA in civil communication (e.g., in mobile cellular network) is the frequency efficiency.

As communication needs have increased there has been a corresponding increase in the number of users which is a problem in mobile systems. The construction of totally new systems and the infrastructures required by them (base stations, exchanges, etc) to overcome these problems is expensive, thus one alternative has been proposed which is to widen the capacities of the existing systems by some additional characteristics. It is, for instance, possible to design "on"- or "in"- the digital TDMA systems (as GSM and DECT) to introduce some CDMA characteristics, whereby the number of the users of the TDMA system can be increased to a total capacity that is possible to reach by the CDMA systems. Thus the system would be a combination of all the multiple access methods, its implementation would be carried out through evolution and its infrastructure would be less expensive.

In the following, the basic factors connected with the CDMA are discussed. In the CDMA system, every user has a specific spreading code by which the users are separated from each other. In an ideal case, the spreading codes are orthogonal in relation to each other. It is thus possible to demodulate from the received signal the symbols transmitted by every user by matched filters according to the spreading codes. In the ideal case when the codes are completely orthogonal, samples taken from the output of the filters include only data from the signal which is to be detected, and is owned by the desired user. In an ideal system it is completely linear and synchronous and where the spreading codes are orthogonal, between the different multiple access methods (FDMA, TDMA, CDMA) there are no differences, as far as the spectrum efficiency is concerned. In practice, however, no system is completely ideal in all conditions. This is why the choice of the multiple access method is significant. For instance, in the mobile radio channel the CDMA system has many advantages: there is less intersymbol interference (ISI) between the symbols than in the narrow band systems, fading will decrease and a narrow band system can operate within the same frequency range as an overlay system with a CDMA system. Also the above mentioned spectrum efficiency or, using another interpretation, the channel capacity will be enhanced.

In practice, in the CDMA system the signals from different users propagate from the transmitter to the receiver along a distance that is different for every signal. Thereby the signals will be delayed in the channel by delays of different length and reach the receiver during different code phases. Furthermore, different users transmit independently from each other which, in addition to the channel influence, causes phase randomness in the received signal. Due to the fact that the orthogonality of the spreading codes is (in general) not possible for all the values of the delays, some influence of the cross-correlations between the signals of other users is seen, in addition to the autocorrelation function of the desired signal, in the outputs of the matched filters to the spreading codes. Thus different users interfere with each other. The created interferences are called multiple access interferences.

In cellular mobile communication, different mobile phones transmit their signals independently from each other, and the signals propagate via different paths to the base station. From the base station the signals to be transmitted to different mobile phones can, however, be transmitted simultaneously. The interfering signals, transmitted by the base station and received by each mobile phone, also propagate via the same path as the desired signal. Therefore, the multiple access interferences are only particularly significant when detecting signals transmitted by different mobile phones at the base station.

The non-orthogonality of the spreading codes is a basic problem that weakens the performance of a practical CDMA system. The different propagation path lengths of the signals also cause differences in the received power levels. This situation arises e.g., when several mobile phones transmit their signals to one and the same base station: the signal, from the mobile phone which is nearest to the base station is stronger than signals from more distant locations when received at the base station. A strong signal disturbs detection of weaker signals. The problem is known as the near-far-problem. In mobile phone telecommunication the near-far-problem is significant particularly when detecting signals from different mobile phones at a base station.

In the CDMA system there would be no near-far-problem, or multiple access disturbances generally, if the spreading codes were accurately orthogonal. Therefore, attempts have been made to solve the problem by generating code families with as little cross-correlation as possible between code members. The multiple access disturbances in the CDMA system cannot in all situations be eliminated through code design, they can only be reduced; the exception being a system with known delays.

When the difference between the power levels of two signals is large, even a minor cross-correlation between the desired and the interfering signal causes a major interference in the detection of a weak signal. This problem can be alleviated by lowering the transmission level of the strong interfering signal so that the received power levels of the desired and the interfering signals are of the same order. This method is called power control. Power control is a straight forward, conventional way to decrease multiple access interferences. The problem in such power control techniques is that the method measures average transmission powers, leading to a worse signal-to-noise ratio and to an increase in the bit error rate. Thus, power control may result in sufficient degradation of a signal so as to annul its beneficial influence.

The interferences created by users between each other can also be decreased by signal detection methods. These methods are called multiple access interference cancelling methods. When there is only one user in the spread spectrum system, or when the spreading codes in a CDMA system are orthogonal, the received signals in a noisy channel can be detected in relation to the bit error probability in an optimal way, using matched filters to the spreading codes. When the spreading codes are non-orthogonal there are better detection methods than the one mentioned above. In CDMA system signal detection studies it has long been assumed that multiple access interferences could be accurately approximated as Gaussian random processes, and that therefore the matched filter and the memoryless detector of the spreading codes could form an optimal receiver in an ideal channel. However, this assumption is not valid in a practical situation.

In practice, a non-ideal cross-correlation function between the codes of different users is detrimental to the operation of the individual receivers as well. It makes both acquisition and tracking of the code synchronisation of the receiver difficult. Respectively, the deviation of the code autocorrelation function from the ideal impulse- like autocorrelation causes problems in code acquisition and tracking, and in a fading multipath channel, in particular.

Therefore there are no spreading codes to create ideal characteristics in all practical situations. By an ideal characteristic is meant the impulse-like characteristic of the code autocorrelation function, whereby it has the top level in relation to length at zero delay value and its sidelobes are zero at all other delay values. Regarding the CDMA multiple use, it is required that the cross-correlation function between the codes in a code set is zero at all possible delay values (completely orthogonal codes) and not only at zero delay.

There is a set of spreading codes with which desired ideal features can be obtained by certain conditions. This kind of a code set comprises complementary codes or sequences. These are characterized by the fact that one single code in the code set is formed by several (equally long) members, the sum of the autocorrelation functions of which is ideally impulse-like. Each CDMA user code is built by the members of the code set so that the sum of the mutual cross-correlation functions is zero at all delay values (non-interacting or completely orthogonal codes or code sets). The formation of spreading codes has been described, e.g., in B.P. Schweitzer, Generalized Complementary code Sets, 1971, doctor's dissertation, University of California, Los Angeles, USA, 87 pages.

Figure 1:
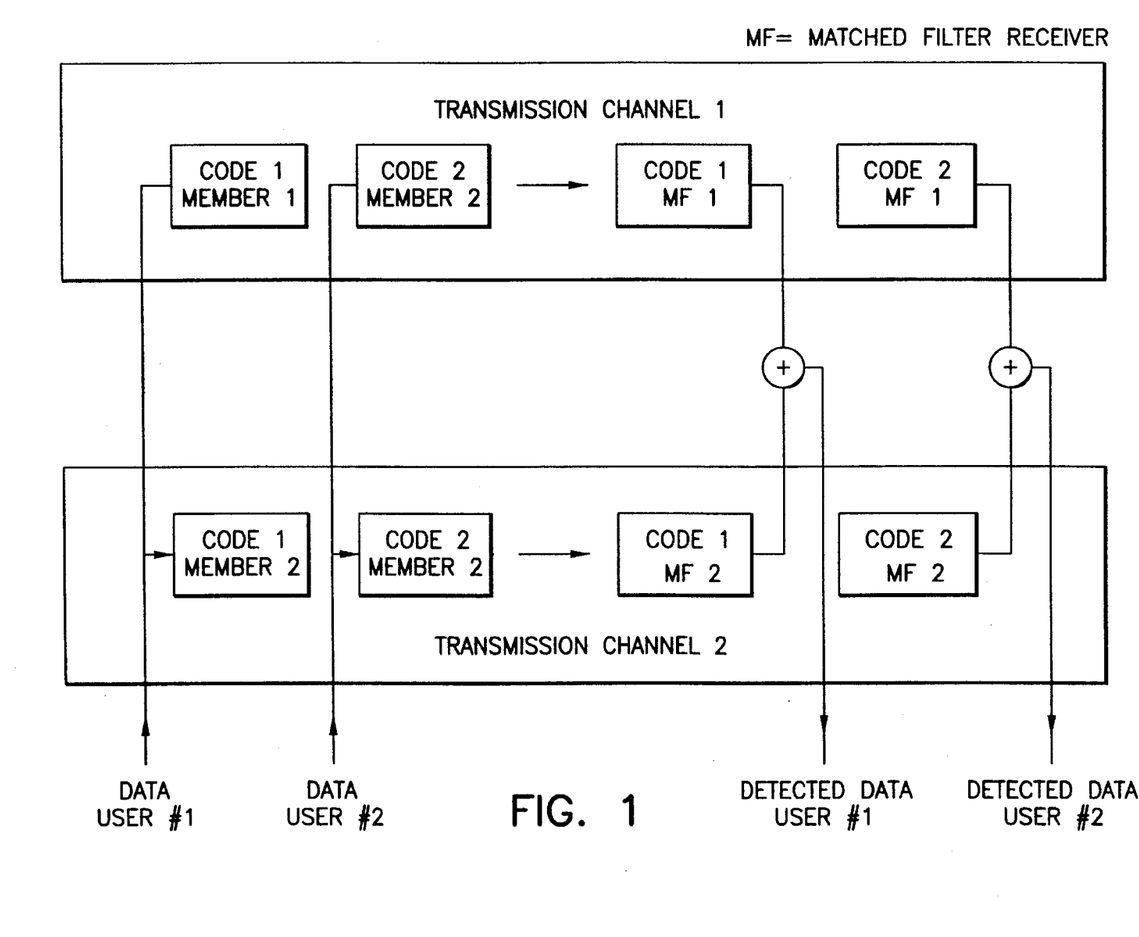
FIG. 1 shows the case already described where the number of users is K.

When putting into practice a communication system where the number of users is K, K complete orthogonal codes are required. They are formed by K members of a code set, e.g., in the way presented in Schweitzer's study. The transmission of the members of the codes of each user requires K orthogonal channels where, by combining (summing) the output signals of the matched filters a situation in a multiple access case is reached where the users do not interfere with each other. For instance in FIG. 1 there is a case of two users (K=2).

Depending on the transmission channel, the orthogonal channels are created in many ways. If the coherence time of the channel is long enough, one transmission channel can be split into K different time slots and thus create K orthogonal channels. Respectively, if the width of the coherence band of the transmission channel is wide enough, the channel can be split into K non-overlapping frequency intervals whereby the orthogonal channels are created. Other orthogonalization possibilities with one channel transmission comprise, e.g., the use of the quadrature components of the carrier wave (K=2) and the use of different polarisation levels or rotation directions.

Figure 2:
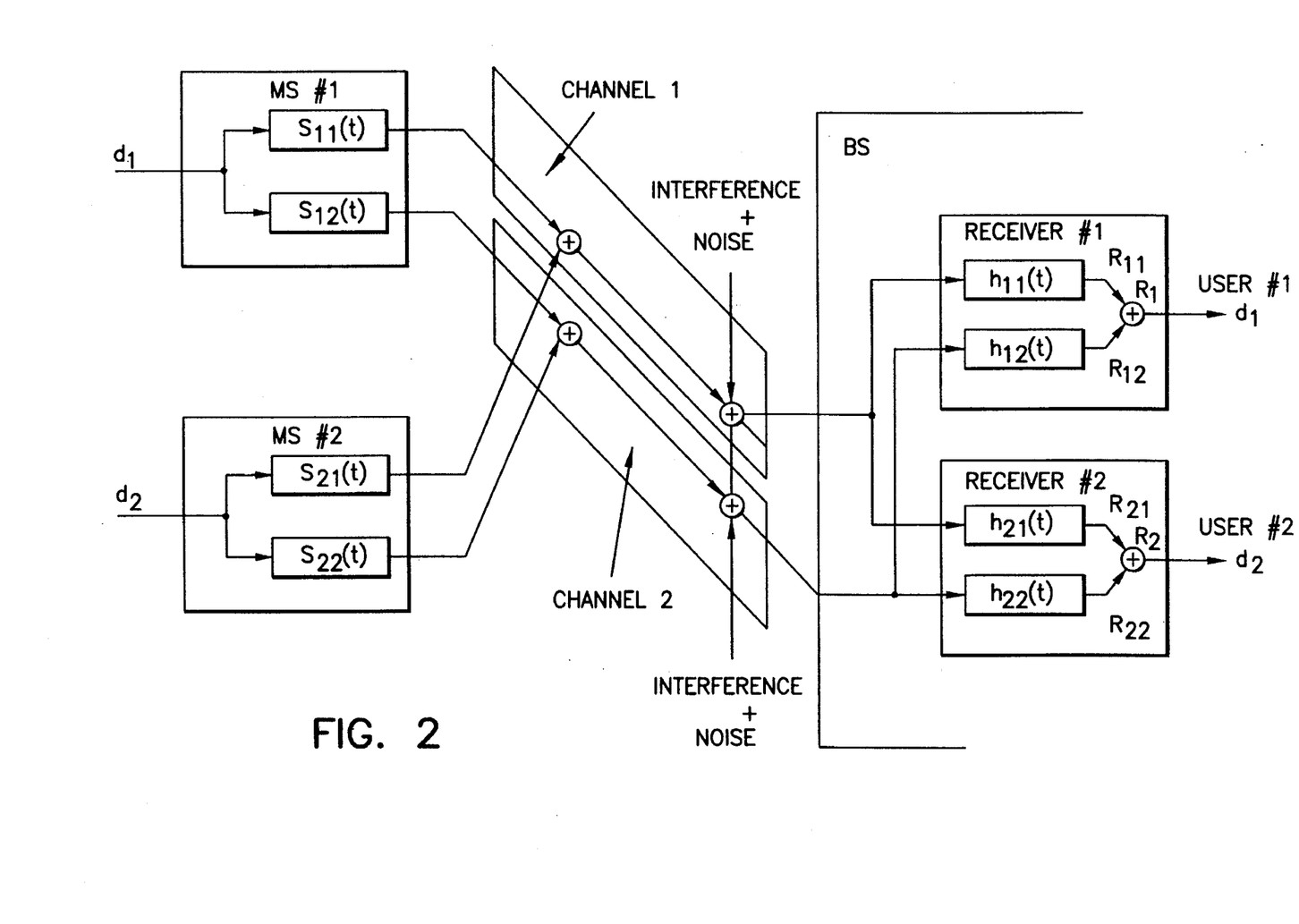
FIGS. 2 and 3a, 3b also show the described case where there are two users, wherein in FIG. 3a the upper trace shows the normalized output signals of receiver #1, when MS #1 is transmitting; the lower trace shows the normalized output signals of receiver #2, when MS #2 is transmitting; the upper trace of FIG. 3b shows the normalized output signals of receiver #1, when MS #2 is transmitting; and the lower trace of FIG. 3b shows the normalized output signals of receiver #2, when MS #1 is transmitting.

FIG. 2 shows a two user CDMA system illustrating the principles of the application of a complementary code set e.g., in a cellular network. A cell includes two mobiles MS#1 and MS#2 and a base station BS, comprising the receivers for both of the users #1 and #2. Ideal characteristics of the complementary code set are brought in to use when the radio channel is time-multiplexed into two orthogonal channels 1 and 2, completely independent from each other. The assumption thereby is that the coherence time $T_D$ is long enough, regarding the orthogonal signal processing required. In a two user system two codes (a code pair) for each user are required. Interferences and noise will be summed into the signals in the radio channels. In this example, it is assumed that the radio channels are ideal. The spreading codes of the users #1 and #2 are e.g., selected according to the principles presented in the Schweitzer study, so that they will, at all delay values, form a complete orthogonal code pair. The spreading code waveforms of the data signal $d_1$ of mobile MS#1 are $s_{11}$ for channel 1 and $s_{12}$ for the orthogonal channel 2. In the base station receiver #1 there is a filter $h_{11}$ matched for the code of channel 1, and $h_{12}$ for channel 2. As a principle, by summing the output signals $R_{11}$ and $R_{12}$ of the filters an ideal detection result $d_1$ for the user #1 is derived from the summed signal $R_1$. Respectively, the spreading codes of the mobile MS#2 are $s_{21}$ and $s_{22}$ and the matched filters $h_{21}$ and $h_{22}$, the summed signal $R_2=R_{21}+R_{22}$ of which gives an ideal detection result for the user #2 ($d_2$).

The signals of the base station receivers are discussed at a principle level. It is assumed that the data signals have been BPSK spreading modulated to the carrier wave and the bits are presented as follows: bit "1"→ waveform "+" and bit "0"→ waveform "−". As an example, let us assume that the system (K=2) uses the following signals (a complementary code pair and to it a complete orthogonal pair): the spreading codes $s_{11}$=+++−, $s_{12}$=++−+ of MS#1, the waveforms $s_{21}$=+−++, $s_{22}$=+−−− of MS#2. Thus, the impulse responses of the matched filters of the base station BS are: receiver #1 $h_{11}$=−+++ and $h_{12}$=+−++ and receiver #2 $h_{21}$=+++ and $h_{22}$=−−−+. It is assumed in this example that the data signals of the users are binary ($d_1$="1", $d_2$="0") and that all gains are normalized as ones. Then MS#1 transmits the waveform $s_{11}$=+++− to channel 1 and the waveform $s_{12}$=++−+ to channel 2. Respectively, MS#2 transmits the waveforms $-s_{21}$=−+−− and $-s_{22}$=−+++, when the influence of the data bit $d_2$ on the BPSK signal is taken into consideration.

Figure 3A:
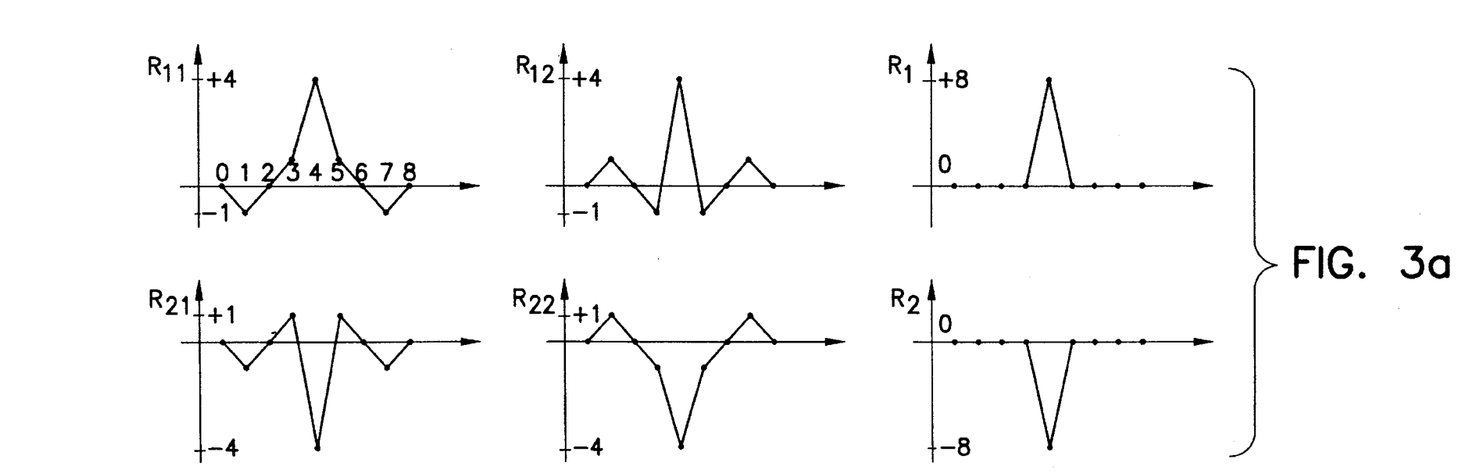
Figure 3B:
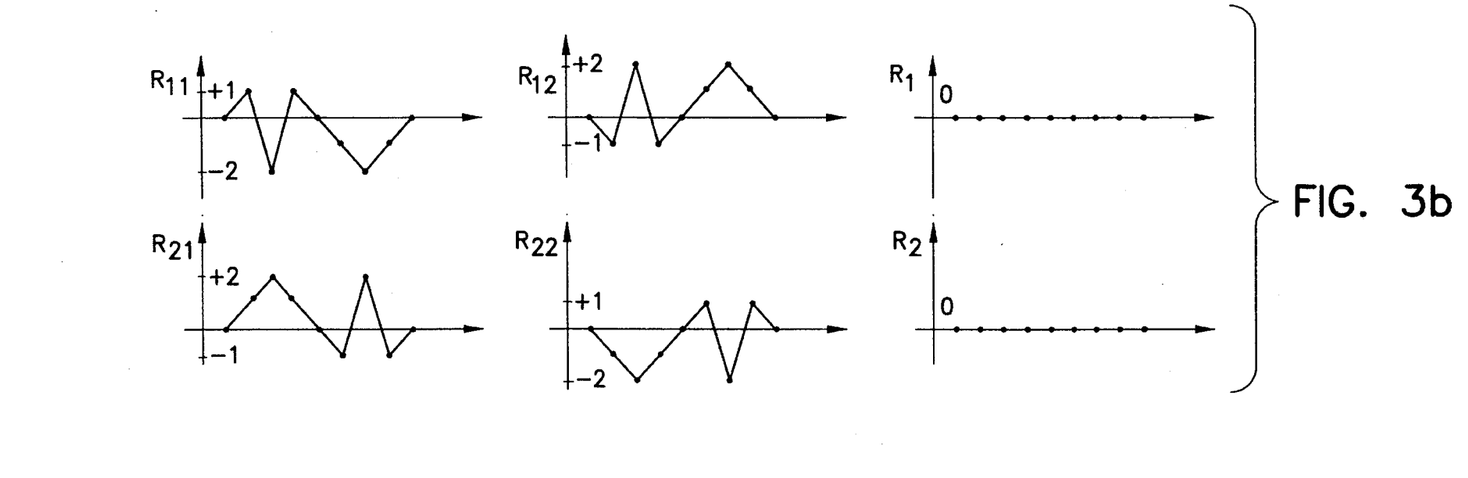

FIG. 3a shows signals of the base station receivers when no interferences nor any noise is summed to the transmission signals in the channels, and when all the gains are assumed to be ones. The receiver gives to both of the users #1 and #2 a waveform that resembles an ideal impulse function and from which the required data symbol detection can be made. FIG. 3b illustrates a multiple access situation when the spreading signals of user #1 (MS#1) are also arriving at the receiver of user #2 (MS#2) and vice versa. The aim of this figure is to show that no multiple access interferences or non-interacting arise and no power control are needed.

SUMMARY OF THE INVENTION

In a first aspect of the invention there is provided a method for radio telephone communication comprising, assigning respective groups of radio telephone users to respective ones of a plurality of orthogonal radio telephone communication channels, and assigning to each user of said groups mutually orthogonal spreading codes, or alternatively a method for radio telephone communication comprising, assigning mutually orthogonal spreading codes to groups of respective radio telephone users, and assigning each of said groups of respective radio telephone users to respective orthogonal radio telephone communication channels.

In a second aspect of the invention there is provided a system for radiotelephone communication, comprising means for assigning respective groups of radio telephone users to respective ones of a plurality of orthogonal radio telephone communication channels, and means for assigning to each user of said groups mutually orthogonal spreading codes, or alternatively a system for radiotelephone communication, comprising, means for assigning mutually orthogonal spreading codes to groups of respective radio telephone users, and means for assigning each of said groups of respective radio telephone users to respective orthogonal radio telephone communication channels.

These have the advantages that the number of users in a communication network or cell can be essentially increased, without any power control methods or any cancelling methods to be applied to the multiple access interferences.

A specific embodiment of the invention will now be described, by way of example only, with reference to the drawings in which:

DETAILED DESCRIPTION OF AN EMBODIMENT OF THE INVENTION

The invention relates to a communication method in which data is transmitted in a combination with both the CDMA and the TDMA methods, using the generally known modulation methods (either coherently, noncoherently, differentially coherently or generally as M-ary symbols), from the base station to the user or vice versa. Both the base station and the users can be fixed and/or mobile. Known duplexing methods can be used in the bidirectional communication.

Figure 4A:
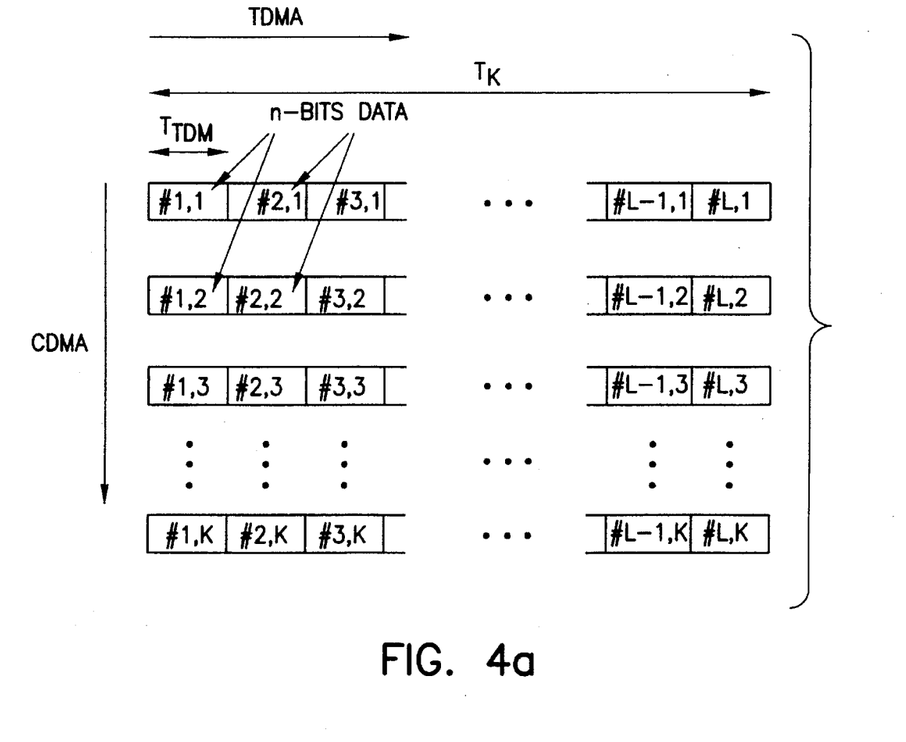
FIG. 4a illustrates the principle of the method according to the invention, where L=a number of TDMA users; K=a number of CDMA users; $T_K$=the length of a frame; and where $T_{TDM}$ =the length of a time slot.
Figure 4B:
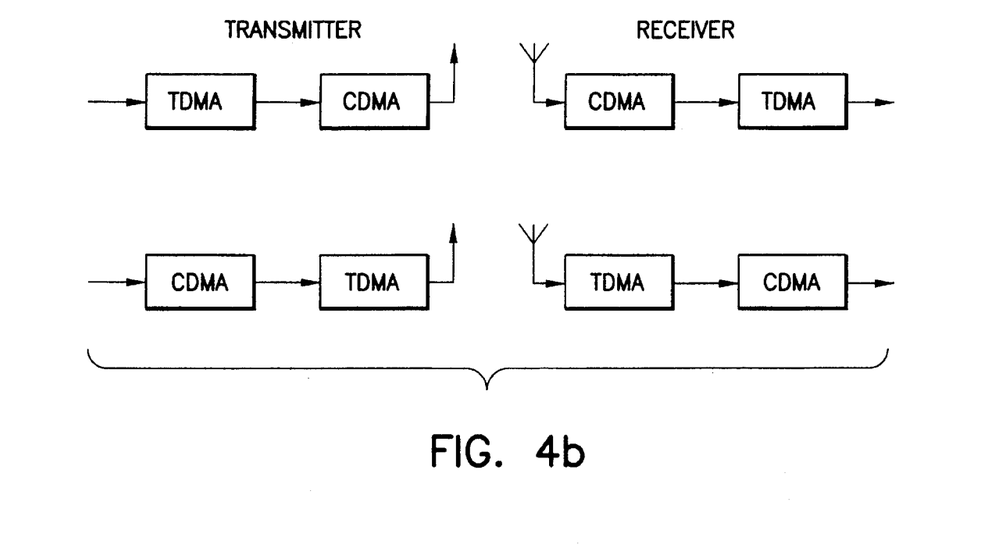
FIG. 4b shows the principle block diagram of the system according to the invention.

FIG. 4a shows the principle of the method. The users of the communication system (L*K) are multiplexed to L TDMA users and K CDMA users so that, during the time frame $T_k$ to be formed from the information of L users, n data bits or data symbols of each user are transmitted in their time slots $T_{TDM}$. During each time slot $T_{TDM}$ data (n data bits or data symbols) from K other users are transmitted by the CDMA method, using the complete orthogonal code sets (complementary code sets) for spreading the spectrum In accordance with the invention there is provided equipment for the communication system (FIG. 4b) or, in case the method is combined with existing TDMA systems (such as GSM or DECT), it also comprises a CDMA part providing the orthogonal increase of the number of users.

The communication system increases the number of users in a cell (network) so that the signals of the users are (as far as possible) orthogonal in relation to each other, so that the users will not interfere (or are non-interacting) with each other. Users that do not interfere with each other are obtained by a TDMA multiple access, whereto more users are connected by complete orthogonal code sets (such as complementary code sets), using the CDMA multiple access.

The users are broken down into groups that do not interfere with each other, first, by time multiplexing, and then mutually orthogonal users are added to each time slot as a CDMA. Breaking the users down to groups that do not interfere with each other can also be carried out in reverse order. Then the time slot comprising CDMA users does not require any network power control methods to solve the near/far problem, nor any multiple access interference cancellation methods, to increase the number of users. If the CDMA part would be carried out in a well known way it would require at least power control in order to avoid the near/far problem.

The total number of users that do not interfere with each other is the number of time slots (L) times the number of the CDMA users (K) in a TDMA time slot.

The communication lank is time synchronized, i.e., all users shall know the real time, with a certain uncertainty, as presupposed by the TDMA method. The time synchronization of the users of the network and of the base station can be obtained in well-known methods. The accuracy requirement of the time synchronization is influenced by the maximum value of the multipath delay spread ($T_M$), the propagation delay difference ($T_R$) of the internal signals of the network (depends on the locations and the relocating of the users) and other inaccuracies of timing ($T_A$).

Within each TDMA time slot, several other simultaneous additional users transmit data using the CDMA method, each using a code set of his own. The spreading code sets have been selected so that they are complete orthogonal in relation to each other, i.e., the cross-correlation between the code sets of the users is zero at all delay values, not only at zero delay value. This kind of code sets can be formed from the known complementary code sets. Then, within a time frame, there is no need to have any exact time synchronization. The duration of the time slot must be equal to or shorter than said coherence time ($T_D$) of the transmission channel, in order to enable the formation the desired combinations of the output signals of the matched filters of the members in the code sets.

Figure 5:
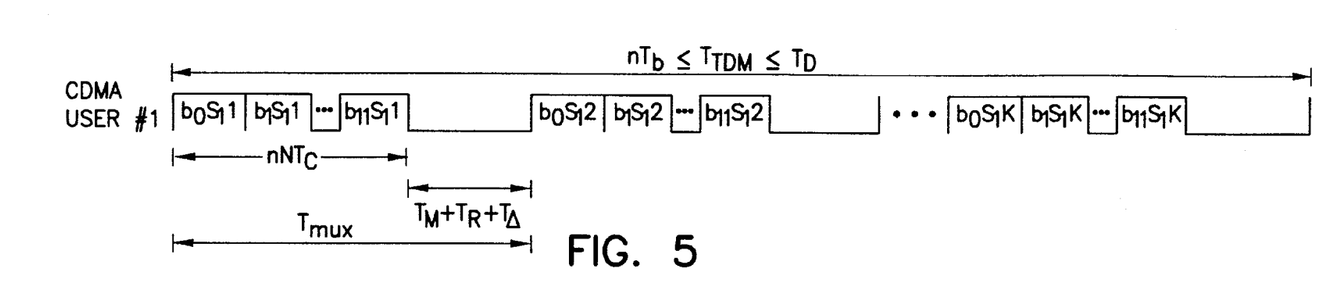
FIG. 5 shows the signal structure connected with the description of the method, where n=bits or symbols per burst; N=length of code set member $S_k$; $b_0 b_1, \ldots, b_n$=date bits or data symbols; K=number of fully orthogonal users; $T_d$=channel coherence time; $T_{TDM}$=length of (possible) time slot; $T_c$=chip length; $R_C$=chip rate; $T_b$=length of bit or symbol; $R_b$=bit or symbol rate; $T_M$=multipath delay spread; $T_R$=propagation delay or differences of propagation delays; $T_A$=inaccuracy of timing; and where $T_{MUX}$=$nNT_C$+($T_M$+$T_R$+$T_A$)

FIG. 5 shows, as an example, a signal structure in one time slot. It is assumed that the availability concerns a complementary code set comprising K member codest S1, S2, . . . ,SK and that the length of each of them is N bits. From these member codes a complete orthogonal spreading code is formed for K users, according to known principles. For instance, the spreading code of a CDMA user #1 comprises the members $S_1 1, S_1 2, S_1 3, \ldots, S_1 K$, where $S_1 K$ (k=1,2, . . . ,K) is one of the members S1, S2, . . . , SK, determined by the complementary characteristics. In the figure, the signal structure indicates one transmission burst, whereby n data bits or data symbols are transmitted. In the beginning of the burst, the data symbols (0, 1, . . . , n) following each other are spreading modulated in well-known ways by the code member $S_1$. The length of this transmission is $nNT_n$ seconds. Then follows a transmission pause the length of which is $T_M + T_R + T_n$ seconds. This transmission pause is used to prevent the signal of the previous code member to reach the receiver during the following code member, due to the multipath propagation or timing inaccuracies, because then the influences of the cross-correlation between the code members would be perceptible in the receiver (it is true that the code members are orthogonal between themselves but not completely orthogonal at all delay values). After the transmission pause the data symbols are retransmitted but now they are spreading modulated by the code member $S_1 2$ and the transmission is followed by a pause. This is repeated until the data symbols have all been spreading modulated by all of the code members of the user. The sum of the times $nNT_c$ and $T_M + T_R + T_\Delta$ is indicated by time $T_{MUX}$ and it can be utilised in the receiver to change the matched filter when the spreading code member is changed in the transmission, but its use is not necessary.

Figure 6:
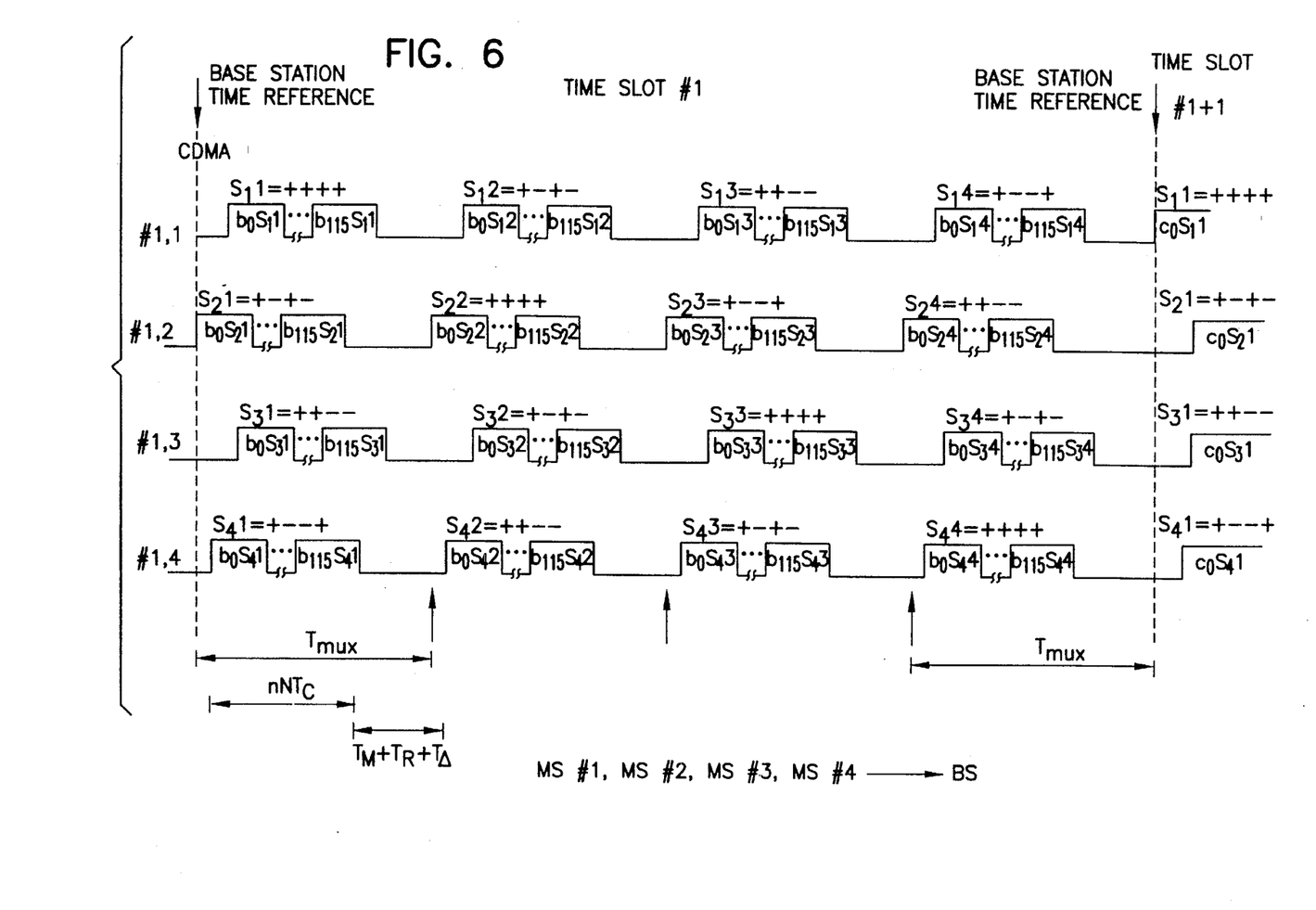
FIG. 6 shows several signals, respectively, within one time slot.

FIG. 6 shows how the method is applied in the case where the users MS#1, MS#2, MS#3, and MS#4 are transmitting by the CDMA multiple use in the same TDMA time slot I to the base station BS. The users can be described with the common way of indication in FIG. 4a: #1,1 #1,2 #1,3 and #1,4. In this example case comprising four CDMA users, it is possible to use the complementary code set S1=++++, S2=+—+—, S3=++——, and S4=+——+. From this the complete orthogonal spreading codes for the users can be derived as follows:

| #1,1 | $S_1 1=$ ++++, | $S_1 2=$ +—+—, | $S_1 3=$ ++——, | $S_1 4=$ +——+, |
|---|---|---|---|---|
| #1,2 | $S_2 1=$ +—+—, | $S_2 2=$ ++++, | $S_1 3=$ +——+, | $S_1 4=$ ++——, |
| #1,3 | $S_3 1=$ ++——, | $S_3 2=$ +——+, | $S_3 3=$ ++++, | $S_3 4=$ +—+—, |
| #1,4 | $S_4 1=$ +——+, | $S_4 2=$ ++——, | $S_4 3=$ +—+—, | $S_4 4=$ ++++. |

It is assumed that in this example n=116 bits are transmitted during the time period $T_{TDM}$. The time reference used by the base station is also indicated in the figure. The time period $T_{MUX}$ can, if desired, be also used in the base station receiver for the change of the spreading code members in matched filtering.

The spreading codes in the time slot shown in FIG. 5 can also be considered, in addition to the use of the complementary code sets, as an innovating way to design the spreading coding entity with transmission pauses (ternary spreading coding).

The processing gain created in the receiver when K matched filtering results are combined, is not needed to eliminate the interferences caused by the other users of the same time slot but only to decrease interference from other sources, for instance, to attenuate transmissions coming e.g., from a neighbouring cell where the same code sets are used (there is no presupposed synchronization between base stations), to eliminate interferences leaking from other carrier wave channels and other, especially narrow band interferences or jamming.

The advantage of the communication method described in the invention is the possibility of increasing the number of users on the same carrier wave or frequency channel so that the users do not interfere or interact with each other (increasing the network capacity). The method can also be applied to existing or planned TDMA communication systems, such as GSM, DECT and the corresponding North American IS-54 or the TDMA system according to the Japanese standard RCR-27. With this method, the network capacity might be increased several times and then its capacity would match a pure CDMA network. Then the method is applicable with the construction of a CDMA accessory.

Figure 7:
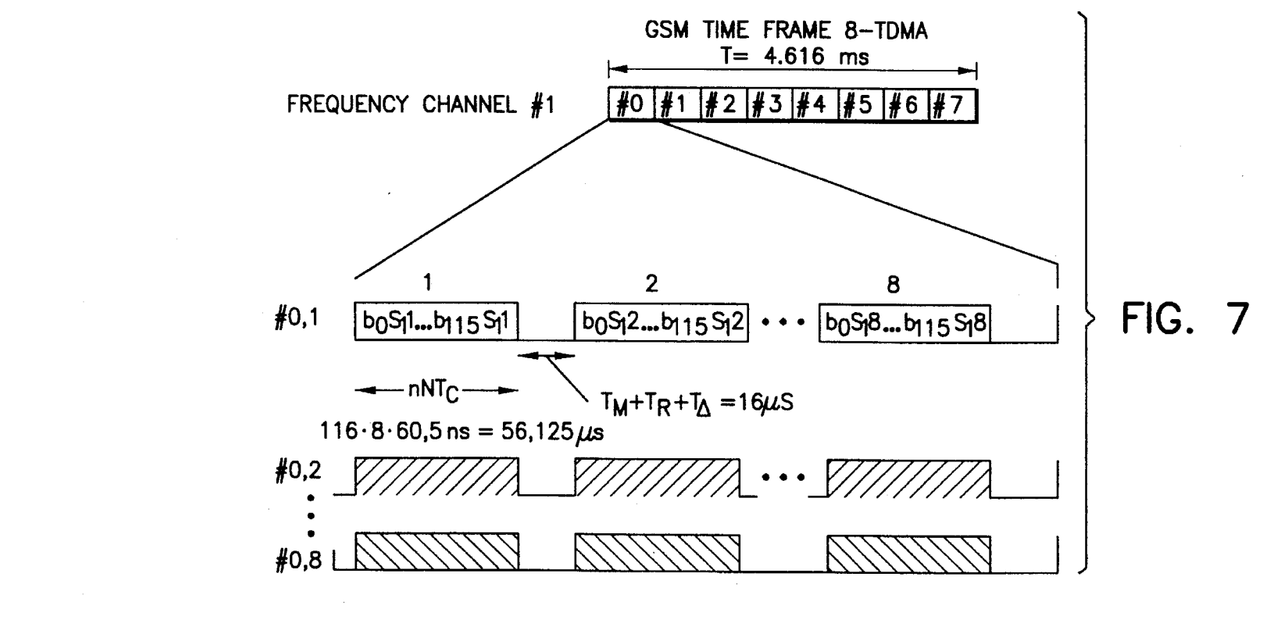
FIG. 7 shows an example of the way to use the invention in the GSM system, where $T_{TDM}$=577 µs; n=116 bits; N=8 chips; $R_C$=16.5 Mchps/s; $T_C$=60.5 ns; L=8; K=8; where 8(56.125 µs+16 µs)=577 µs; and where it is noted that the #2 ... #8 code set members are selected from the base set S1. .. S8 on condition of orthogonality.

FIG. 7 shows the GSM system principle as an operational example of the invention. When about 16.5 Mbits/s is selected as the bit rate of the code, eight other, complete orthogonal users can operate within one GSM time slot in a propagation environment where the multipath delay spread, the differences in propagation delays and in timing accuracy will altogether be 16 µs. Then 64 users in all can be taken to one single carrier wave, or frequency channel.

FIG. 6 can be used as another application example of another GSM type system. When 3.62 Mbits/s is selected as the bit rate in the FIG. 7 propagation environment, and with the conditions K=N=4, altogether 32 users could be taken on one carrier wave, or frequency channel.

Using complementary code sets will mean further advantages connected with single radio links (BS→MS#n, MS#n→BS). From the point-of-view of a one user receiver, the ideal characteristics of the spreading code autocorrelation function will facilitate the acquisition and tracking operations of code synchronization, as well as RAKE reception.

In a network or cell, no power control methods nor any multiple access interference cancelling methods are required to increase their capacities. It is possible to use a rough power control, as in the TDMA systems, to compensate the propagation attenuations, due to the mobile stations locating at different distances from the base station.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. A system for radiotelephone communication, said system including at least one base station capable of bidirectional communications with a plurality of radio telephones, said system comprising:

means for assigning respective groups of radio telephone users to one of a plurality of orthogonal radio telephone communication channels; and means for assigning to each user of said groups complete orthogonal spreading codes selected from at least one complementary spreading code set, wherein individual ones of radio telephone users bidirectionally communicate with said at least one base station using said complete orthogonal spreading codes, and wherein individual ones of said radio telephone users transmitting to said at least one base station are enabled to transmit with a power level that is independent of a power level of other ones of the radio telephone users that are transmitting to said at least one base station, and further comprising:

means for transmitting within a time slot a plurality of transmission data bursts each of which comprises a predetermined number of data bits or data symbols; and means for modulating the data bits or data symbols of each transmission data burst with a first complete orthogonal spreading code member ($S_k1$), and for then modulating the data bits or data symbols with a second complete orthogonal spreading code member ($S_k2$), and then continuing to modulate the data bits or data symbols with further complete orthogonal spreading code members until ($S_kK$).

2. A system as set forth in claim 1, wherein a length of a transmission pause between each transmission of a data burst is $T_M+T_R+T_A$, where $T_M$ is a multipath delay spread; $T_R$ is a signal propagation delay difference within a network or cell within which the burst is transmitted; and $T_A$ is an inaccuracy of time synchronization of the users.

3. A system as set forth in claim 2 and further comprising means, responsive to a total time $T_{MUX}$ associated with the modulation of each of the transmission data bursts by all of the members of the complete orthogonal spreading code set, including transmission pauses between transmitted bursts, for changing complete orthogonal spreading code members in a base station transmitter and for changing matched filters in a mobile station receiver, respectively, when transmitting from the base station to the mobile station, and for changing complete orthogonal spreading code members in a mobile station transmitter and for changing matched filters in a base station receiver, respectively, when transmitting from the mobile station to the base station.

4. A system for radiotelephone communication, said system including at least one base station capable of bidirectional communications with a plurality of radio telephones, said system comprising;

means for assigning complete orthogonal spreading codes to groups of respective radio telephone users, said complete orthogonal spreading codes being selected from at least one complementary spreading code set; and means for assigning each of Said groups of respective radio telephone users to respective orthogonal radio telephone communication channels, wherein individual ones of radio telephone users bidirectionally communicate with said at least one base station using said complete orthogonal spreading codes, and wherein individual ones of said radio telephone users transmitting to said at least one base station are enabled to transmit with a power level that is independent of a power level of other ones of the radio telephone users that are transmitting to said at least one base station, and further comprising:

means for transmitting within a time slot a plurality of transmission data bursts each of which comprises a predetermined number of data bits or data symbols; and means for modulating the data bits or data symbols of each transmission data burst with a first complete orthogonal spreading code member ($S_k1$), and for then modulating the data bits or data symbols with a second complete orthogonal spreading code member ($S_k2$), and then continuing to modulate the data bits or data symbols with further complete orthogonal spreading code members until ($S_kK$).

5. A system as set forth in claim 4, wherein a length of a transmission pause between each transmission data burst is $T_M+T_R+T_A$, where $T_M$ is a multipath delay spread; $T_R$ is a signal propagation delay difference within a network or cell within which the burst is transmitted; and $T_A$ is an inaccuracy of time synchronization of the users.

6. A system as set forth in claim 5 and further comprising means, responsive to a total time $T_{MUX}$ associated with the modulation of each of the transmission data bursts by all of the members of the complete orthogonal spreading code set, including transmission pauses between transmitted bursts, for changing complete orthogonal spreading code members in a base station transmitter and for changing matched filters in a mobile station receiver, respectively, when transmitting from the base station to the mobile station, and for changing complete orthogonal spreading code members in a mobile station transmitter and for changing matched filters in a base station receiver, respectively, when transmitting from the mobile station to the base station.

7. A method for operating a TDMA/CDMA communication system having at least one base station and a plurality of user radiotelephones, comprising the steps of:

assigning a first set of the plurality of user radiotelephones to a first time slot of a frame having a plurality L of time slots, assigning a second set of the plurality of user radiotelephones to a second time slot of the frame, and assigning an Lth set of the plurality of user radiotelephones to the Lth time slot of the frame; wherein the steps of assigning include a step of further assigning to individual ones of the user radiotelephones of each set a complete orthogonal spreading code selected from a complementary spreading code set for modulating information transmitted to and from the base station during the assigned time slot, wherein individual ones of the user radiotelephones of a set that transmit within an assigned time slot are received by the base station in a substantially non interfering manner one with another, the method further comprising the steps of, transmitting transmission bursts from a radiotelephone during a time slot, each of the transmission bursts comprising a predetermined number of data bits or data symbols; the step of transmitting including the steps of, modulating the data bits or data symbols of each transmission burst with a first complete orthogonal spreading code member $S_k1$ followed with a transmission pause, with a second complete orthogonal spreading code member $S_k2$ followed with a transmission pause, and continuing to modulate the data bits or data symbols with further complete orthogonal spreading code members, each followed with a transmission pause;

wherein the transmission pause between each transmission data burst is at least equal to approximately $T_M+T_R+T_A$, where $T_M$ is a multipath delay spread; $T_R$ is a signal propagation delay difference within a network or cell within which the burst is transmitted; and $T_A$ is an inaccuracy of time synchronization of the radiotelephones within the network or cell.

8. A method as set forth in claim 7 wherein communications between the plurality of user radiotelephones and the at least one base station occurs without requiring transmitter power control information to be transmitted between the base station and the user radiotelephones.

9. A system for radiotelephone communication, said system including at least one base station capable of bidirectional communications with a plurality of radio telephones, said system comprising:

means for assigning respective groups of radio telephone users to one of a plurality of complete orthogonal radio telephone communication channels; and means for assigning to each user of said groups complete orthogonal spreading codes selected from at least one complementary spreading code set, wherein individual ones of radio telephone users bidirectionally communicate with said at least one base station using said complete orthogonal spreading codes, and wherein individual ones of said radio telephone users transmitting to said at least one base station are enabled to transmit with a power level that is independent of a power level of other ones of the radio telephone users that are transmitting to said at least one base station, and further comprising:

means for transmitting within a time slot a plurality of transmission data bursts each of which comprises a predetermined number of data bits or data symbols followed by a transmission pause; and means for modulating the data bits or data symbols of each transmission data burst with a first complete orthogonal spreading code member ($S_k 1$) followed by a transmission pause, and for then modulating the data bits or data symbols with a second complete orthogonal spreading code member ($S_k 2$) followed by a transmission pause, and then continuing to modulate the data bits or data symbols with further complete orthogonal spreading code members, each followed with a transmission pause, until ($S_k K$), wherein a length of the transmission pause between each transmission of a data burst is $T_M + T_R + T_\Delta$, where $T_M$ is a multipath delay spread; $T_R$ is a signal propagation delay difference within a network or cell within which the burst is transmitted; and $T_\Delta$ is an inaccuracy of time synchronization of the users.

10. In a system for radiotelephone communication, the system including at least one base station capable of bidirectional communications with a plurality of radio telephones, a method for communicating information between the base station the plurality of radio telephones, comprising the steps of:

assigning respective groups of radio telephone users to one of a plurality of complete orthogonal radio telephone communication channels; and assigning to each user of said groups complete orthogonal spreading codes selected from at least one complementary spreading code set, wherein individual ones of radio telephone users bidirectionally communicate with the at least one base station using assigned complete orthogonal spreading codes;

and further comprising the steps of:

transmitting within a time slot a plurality of transmission data bursts each of which comprises a predetermined number of data bits or data symbols followed by a transmission pause;

modulating the data bits or data symbols of each transmission data burst with a first complete orthogonal spreading code member ($S_k 1$) followed by a transmission pause;

modulating the data bits or data symbols with a second complete orthogonal spreading code member ($S_k 2$) followed by a transmission pause;

continuing to modulate the data bits or data symbols with further complete orthogonal spreading code members, each followed with a transmission pause, until ($S_k K$); wherein a length of the transmission pause between each transmission of a data burst is $T_M + T_R + T_\Delta$, where $T_M$ is a multipath delay spread; $T_R$ is a signal propagation delay difference within a network or cell within which the burst is transmitted; and $T_\Delta$ is an inaccuracy of time synchronization of the radio telephone users; and wherein individual ones of the radio telephone users transmitting to the at least one base station may transmit with a power level that is independent of a power level of other ones of the radio telephone users that are transmitting to the at least one base station.

* * * * *

UNITED STATES PATENT AND TRADEMARK OFFICE
CERTIFICATE OF CORRECTION

PATENT NO. : 5,533,013
DATED      : July 2, 1996
INVENTOR(S) : Pentti Leppanen

It is certified that error appears in the above-indentified patent and that said Letters Patent is hereby corrected as shown below:

Title page, item [73], Assignee: should read--Nokia Mobile Phones., Salo, Finland; Nokia Telecommunications OY, Espoo, Finland--.

Signed and Sealed this

Twenty-ninth Day of July, 1997

Attest:

BRUCE LEHMAN

Attesting Officer

Commissioner of Patents and Trademarks